(12) United States Patent
Albertelli (10) Patent No.: US 12,083,773 B2
(45) Date of Patent: Sep. 10, 2024

(54) METHOD FOR PRODUCING CURED POLYMERIC SKINS

(71) Applicant: ACELL INDUSTRIES LIMITED, Dublin (IE)

(72) Inventor: Aldino Albertelli, Dublin (IE)

(73) Assignee: Acell Industries Limited, Dublin (IE)

( * ) Notice: Subject to any disclaimer, the term of this patent is extended or adjusted under 35 U.S.C. 154(b) by 866 days.

(21) Appl. No.: 16/635,185

(22) PCT Filed: Jul. 31, 2018

(86) PCT No.: PCT/GB2018/052181
§ 371 (c)(1),
(2) Date: Jan. 30, 2020

(87) PCT Pub. No.: WO2019/025783
PCT Pub. Date: Feb. 7, 2019

(65) Prior Publication Data
US 2021/0053300 A1    Feb. 25, 2021

(30) Foreign Application Priority Data
Jul. 31, 2017    (GB) .................................. 1712320

(51) Int. Cl.
*B32B 27/12*    (2006.01)
*B29C 35/08*    (2006.01)
(Continued)

(52) U.S. Cl.
CPC .......... *B32B 27/12* (2013.01); *B29C 35/0805* (2013.01); *B29C 70/465* (2013.01);
(Continued)

(58) Field of Classification Search
CPC ...... B29L 2031/108; B29K 2105/0863; B29K 2061/04; B29K 2267/00; B29K 2105/251; B29K 2105/0872; B29C 70/465; B29C 35/0805; B29C 2035/0855; C08J 2361/04; C08J 5/18; C08J 5/121; B32B 2419/06; B32B 2262/101; B32B 2264/1021;
(Continued)

(56) References Cited

U.S. PATENT DOCUMENTS

| 4,764,238 A | 8/1988 | Dastin et al. |
| 9,944,063 B1 | 4/2018 | Lakrout et al. |

FOREIGN PATENT DOCUMENTS

| EP | 0196055 A2 | 10/1986 |
| EP | 0196055 A3 | 3/1988 |

(Continued)

OTHER PUBLICATIONS

GB Search Report dated Feb. 2, 2018 for App No. GB1712320.9.
(Continued)

*Primary Examiner* — Vishal I Patel
(74) *Attorney, Agent, or Firm* — Ryan T. Grace; Advent, LLP (57) ABSTRACT

This invention relates to the production of cured polymeric skin materials. In particular, the invention relates to methods and substrates for the production of skin materials, for example, for use in building, furniture, and as architectural components for example in roofing materials such as roofing tiles, or for brick wall effect materials.

21 Claims, 4 Drawing Sheets

(51) Int. Cl.

| | |
|---|---|
| *B29C 70/46* | (2006.01) |
| *B32B 5/02* | (2006.01) |
| *B32B 5/16* | (2006.01) |
| *B32B 27/14* | (2006.01) |
| *B32B 27/42* | (2006.01) |
| *C08J 5/12* | (2006.01) |
| *C08J 5/18* | (2006.01) |
| *E04F 13/14* | (2006.01) |
| *B29K 61/04* | (2006.01) |
| *B29K 105/00* | (2006.01) |
| *B29K 105/08* | (2006.01) |
| *B29K 267/00* | (2006.01) |
| *B29L 31/10* | (2006.01) |

(52) U.S. Cl.
CPC ............... *B32B 5/022* (2013.01); *B32B 5/16* (2013.01); *B32B 27/14* (2013.01); *B32B 27/42* (2013.01); *C08J 5/121* (2013.01); *C08J 5/18* (2013.01); *E04F 13/142* (2013.01); *B29C 2035/0855* (2013.01); *B29K 2061/04* (2013.01); *B29K 2105/0863* (2013.01); *B29K 2105/0872* (2013.01); *B29K 2105/251* (2013.01); *B29K 2267/00* (2013.01); *B29L 2031/108* (2013.01); *B32B 2262/101* (2013.01); *B32B 2264/1021* (2020.08); *B32B 2419/06* (2013.01); *C08J 2361/04* (2013.01)

(58) Field of Classification Search
CPC .......... B32B 27/42; B32B 27/14; B32B 5/16; B32B 5/022; B32B 27/12; E04F 13/142
See application file for complete search history.

(56) References Cited

FOREIGN PATENT DOCUMENTS

| | | | | |
|---|---|---|---|---|
| EP | 1082379 | A1 | 3/2001 | |
| EP | 1922356 | B1 | 10/2012 | |
| GB | 2464569 | A | 4/2010 | |
| GB | 2480253 | A * | 11/2011 | ............... E04C 1/40 |
| JP | H10119222 | A | 5/1998 | |
| JP | 2004291360 | A | 10/2004 | |
| WO | 9935364 | A1 | 7/1999 | |
| WO | 9950341 | A1 | 10/1999 | |
| WO | 2007029222 | A1 | 3/2007 | |
| WO | 2007127156 | A2 | 11/2007 | |
| WO | 2010046698 | A1 | 4/2010 | |
| WO | 2010046699 | A2 | 4/2010 | |
| WO | 2010046699 | A3 | 10/2010 | |
| WO | 2013084014 | A2 | 6/2013 | |
| WO | 2013084014 | A3 | 10/2013 | |
| WO | 2016204681 | A1 | 12/2016 | |
| WO | 2017025749 | A1 | 2/2017 | |
| WO | 2017025750 | A1 | 2/2017 | |
| WO | 2017096423 | A1 | 6/2017 | |

OTHER PUBLICATIONS

International Search Report dated Sep. 19, 2018 for App No. PCT/GB2018/052181.
Examination Report in Europe for Application No. 18755255.9, dated Jul. 22, 2021.
Search Report in the United Kingdom for Application No. GB1712320.9, dated Aug. 3, 2018.

* cited by examiner

METHOD FOR PRODUCING CURED POLYMERIC SKINS

FIELD OF THE INVENTION

This invention relates to the production of cured polymeric skin materials. In particular, the invention relates to methods and substrates for the production of skin materials, for example, for use in building, furniture, and as architectural components for example in roofing materials such as roofing tiles, or for brick wall effect materials.

BACKGROUND TO THE INVENTION

Panels and other elements used in building have traditionally been made of natural materials. For example, doors and panels for buildings and furniture have traditionally been made from wood. Other walls and panels have been made or brick or stone. Roofing tiles have traditionally been made from clay, slate or terracotta.

There is now a trend for building elements and other products which would traditionally have used natural products to be made from "non-natural" or synthetic products, for example plastics materials. Such modern materials have many chemical, physical and cost advantages compared with traditional materials. Foam resin skin panels of the kind comprising a foam resin layer and a polymeric cured skin, for example, a cellular foam with an sheet moulding compound (SMC) skin surface are being employed increasingly in the building, decorating and furniture industries because of the wide range of useful properties achievable. Increasingly surface effects have been added to the skin material to form, for example, simulated surfaces such as a simulated stone surface, or a brick wall.

In a known method of forming panels, the panels comprise a pair of outer skins and an internal foam core. The skin or skins and the foam core are formed separately and may then be bonded together, usually by means of an adhesive. In known systems, the skins may be formed by compression moulding of a SMC. The SMC includes a thermosetting resin, for example a polyester resin, together with reinforcing fibres, for example glass fibres.

In known methods the SMC is folded to form a block of charge and placed into a preheated moulding cavity. The mould is closed and pressure is applied to press the moulding compound so that it spreads to all parts of the mould. Heat and pressure is applied until the moulded material has cured.

There are disadvantages associated with forming the SMC skins using such a method. For example, the SMC needs to be folded to form a block in the mould cavity. This is because air trapped in the mould cavity and gases formed during the curing reaction need to be released during the moulding operation. Further, high pressure is required to affect the moulding; pressures of 1000 to 1200 tonnes per m$^2$ are not unknown. Another disadvantage associated with known methods of forming cured skins is that the skin damages the mould whilst curing so that it cannot be reused. Specifically, the skin stretches the mould during curing, or if a surface decoration is present, this may scratch the mould and causes damage to it—both of these disadvantages prevent the mould being reused.

To try and alleviate these problems it was found (for example in WO2009/044169 and WO2010/046699) that by contacting the curable material with a solid cellular substrate, gas or vapour that might otherwise remain and/or build up in the pressing region (i.e. the area where the surface of the substrate and a sheet-form curable material are being pressed together) could be removed by flowing into the cells of the solid substrate and as such the pressure required to form the composite product significantly reduced.

Known solid substrates have an open-celled cellular structure, which allows movement of the gases away from the pressing region whilst retaining dimensional stability within the mould. However, these methods are limited in that only certain materials may be used as the substrate, i.e. only materials which have a suitable open cell structure to allow air and/or other gasses to be removed. Currently used solid substrates are substantially rigid materials, for example self-supporting foams which are resilient to load and do not collapse under moderate pressure. These foams generally have cell sizes in the range of 0.5 mm to 5 mm. The sheet-form curable material (for example SMC) bonds to the substrate during curing. This causes difficulties if the skin is to be used independently of the foam substrate. Known methods machine the cured skin off the foam surface which leads to damage of the skin surface.

In the processes described above, a large amount of materials are required in order to make the cured skin, some of which are not present in the final product and cannot be reused, for example the substrate material. This creates a large cost associated with the method.

There remains a need in the art for an alternative process for the production of a polymeric cured skin, in particular an SMC containing polymer skin material which seeks to alleviate or reduce one or more of the issues discussed above.

SUMMARY OF THE INVENTION

According to the present invention, there is provided a method of forming a cured polymeric skin, the method comprising:
  providing a sheet-form curable material;
  providing a substrate in particulate form;
  contacting the particulate substrate with a first surface of the sheet-form curable material;
  pressing the particulate substrate to the sheet-form curable material; and
  at least partially curing the sheet-form curable material to form a skin,
wherein the configuration of the substrate is such that gas and/or vapour can be displaced from the pressing region, and a portion of the sheet-form curable material flows into the particulate substrate.

The present invention also provides a method of forming a cured polymeric skin, the method comprising:
  optionally providing a template on a press;
  providing a sheet-form curable material on the press
  arranging masonry tiles on a surface of the sheet-form curable material to form a pattern;
  applying a particulate substrate such that it covers at least any remaining surface area of the sheet-form material to the height of the masonry tiles (and preferably also the masonry tiles);
  pressing the sheet-form curable material to the substrate; and
  at least partially curing the sheet-form curable material,
wherein the configuration of the particulate substrate is such that gas and/or vapour can be displaced from the pressing region, and a portion of the sheet-form curable material flows into the particulate substrate.

Also provided in accordance with the present invention is a skin formed by a method disclosed herein.

Such polymeric skins may comprise at least a portion of the particulate substrate material present on a surface of the skin; and optionally a particulate material is present on a second surface of the skin.

Additionally, such polymeric skins may comprise one or more masonry tiles present on a surface of the skin as well as at least a portion of the particulate substrate material.

Also provided is the use of a particulate material in a method of the present invention.

The methods of the present invention may be advantageous in a number of respects. For instance, it has surprisingly been found that a particulate material can be used as a pseudo-substrate (hereinafter referred to as a substrate) to remove gas or vapour from the pressing region.

In addition, the particulate material can be easily removed from the polymeric cured skin, thus enabling a facile way to obtain the skin material independently of a substrate. This also provides the added advantage of a more efficient process as the step of machining the skin off the substrate is no longer necessary. The process of the present invention takes less time, and costs less compared to known processes.

A particular advantage of the present invention is that remaining particulate material may be reused after the polymeric cured skin has been removed therefrom. This lowers the overall cost of the process. The use of the reusable particulate substrate which can be brushed off the sheet-form curable material allows for key method steps in known methods to be avoided meaning that the present process take less time and cost less money whilst still alleviating the problem of gas build up in the pressing region.

A still further advantage of the present invention is that the particulate material may be pressed into the sheet-form curable material such that a textured surface appears on a surface of the skin once cured. In some instances, this removes the need to apply a separate layer of particulate material on a second surface of the sheet-form curable material during production.

DESCRIPTION OF THE INVENTIONS

As discussed above, the present invention provides a method of forming a cured polymeric skin, the method comprising:

providing a sheet-form curable material;
providing a substrate in particulate form;
contacting the particulate substrate with a first surface of the sheet-form curable material;
pressing the particulate substrate to the sheet-form curable material; and
at least partially curing the sheet-form curable material to form a skin, wherein the configuration of the substrate is such that gas and/or vapour can be displaced from the pressing region, and a portion of the sheet-form curable material flows into the particulate substrate.

By using a particulate substrate, air and gas produced during the pressing step can pass through interstitial spaces between particles so that the risk of air and gasses leading to deformities in the skin are reduced.

By particulate, it is meant that the substrate material is in the form of particles or granules. While particles of any suitable size may be used, in preferred examples of the invention the particles or granules have a diameter in the range of 0.05 mm to 50 mm; a diameter in the range of 0.05 mm to 10 mm, more preferably a diameter in the range of 0.05 mm to 2 mm.

Preferably the particulate substrate is such that gas or vapour can escape from the pressing region in a direction having at least a component in a direction generally transverse to the pressing direction in which the sheet-form curable material is pressed to the substrate.

The particulate substrate comprises a plurality of interstitial spaces interstitial spaces such that the material of the sheet-form curable material passes into the interstitial spaces of the substrate material during pressing. Herein, references to 'interstitial spaces' means the spaces between the particles or grains of the material.

The density of the particulate substrate is such that the interstitial spaces are large enough to allow flow of gas and/or air from the pressing region as discussed above.

The configuration of the substrate is such that it can release pressure in the pressing region. While substrates with interstitial spaces of any suitable size may be used, in some examples, the interstitial spaces are in the range of 0.5 mm to 5 mm in diameter, more preferably 0.5 or 1 mm to 2 or 3 mm in diameter.

Any suitable amount of particulate material may be used. In particular, an amount suitable to allow air and other gasses produced during pressing and curing to pass through the substrate interstitial spaces and prevent distortion of the cured polymeric skin. In a preferred embodiment of the invention an excess of particulate material is used. In some embodiments the substrate has a depth of 1 cm to 10 cm, preferably 3 cm to 6 cm.

In preferred embodiments of the invention the particulate substrate comprises a material selected from sand, gypsum, graphite, calcium carbonate, hydrated organic salts, ceramic materials, ground glass, ground stone, clay materials, metal oxides, powdered paints, and mixtures thereof. In a preferred embodiment of the invention the particulate material comprises sand.

It will be appreciated that the particulate substrate may also be used to form a finish to the formed skin. Such finishes produced may vary according to type and colour, and may be controlled by the use of the particulate materials used.

Pigments may be added to the particulate substrate material in order to control colour. By way of further example, ground glass can be used to form a desirable texture. Other material for example grits might be used on their own or in combination to obtain the desired effect. If stone or a material other than sandstone is to be simulated or a different effect is being obtained, the particulate might include other materials or mixtures of materials, for example carbon containing materials, graphite, clay, marble and/or coloured dust. The particulate may include a mixture of different coloured particulates which have been pre-sorted, or coloured. A colouring treatment may be applied to the particulates before pressing, and/or could be applied after formation of the skin.

Alternatively, or in addition, the material may be coloured to give an attractive finish.

Different colours or textures of finish may be used as required. Where other effects are to be obtained, the particulate material may include other materials, for example grains having low or high hardness, angular or smooth shape, be of different sizes and/or of different natural colours. The particulates are preferably insoluble, but this might not be essential, for example where the resulting product is to be used in an internal application and not exposed to weathering. The particulates may comprise individual particles, or might comprise a powder, for example compressed to form granules.

Different coloured sands may be used to produce an attractive and realistic stone or brick effect; different coloured sands may be used to produce an attractive pattern. It will be understood that surface finishing effects may include, for example, brick, stone, marble, stucco, and slate.

In some examples, larger particles can be used. In some cases, gravel or pebbles can be embedded into the skin using methods described. Thus a "pebble dashed" effect can be achieved. For example, exterior skins for houses having a pebble dashed appearance can be formed.

The particulate substrate may also comprise one or more materials susceptible to electromagnetic radiation, for example one or more materials susceptible to microwave radiation. Suitable materials may include one or more of graphite, carbon black, metals, metal oxides, hydrated inorganic salts or compounds, hydrated organic salts or compounds, water, or ceramic materials.

The method of the present invention comprises the step of providing a sheet-form curable material, and contacting the particulate substrate with a first surface of the sheet-form curable material. In such a step, the particulate substrate preferably covers substantially all of the sheet-form material.

The sheet-form curable material preferably comprises a thermoset. The material may include further components, for example components to enable the material to be handled in sheet-form.

The sheet-form curable material of aspects of the invention may include any appropriate matrix composition. For example, the matrix may include one or more of a thermosetting polymer, for example an epoxy resin, a phenolic resin, a polyester resin, a polyvinylester resin, a bismaleimide or polyimide, and/or any other suitable material. The material may include melamine, which is useful as a fire retardant. The matrix materials may further include hardeners, accelerators, fillers, pigments, and/or any other components as required. The matrix may include a thermoplastic material.

The sheet-form curable material may have a thickness of 0.3 to 20 mm, such as 0.5 to 10 mm.

With regard to the use of phenolic resins, the prior art (see for example U.S. Pat. Nos. 3,005,798, 3,663,503 and 4,369,259) teaches that in order to produce a phenolic resin with limited or reduced colour change, both a colour-stabilising agent and an acid catalyst must be present. Clearly, the requirement of both reactants will increase the costs of producing lighter coloured resins.

Furthermore, as shown in some of the above mentioned documents, the colour stabilising agent may be required to be added at a specific point in the reaction process (i.e. whilst the phenol resin is still in water-soluble form) in order to achieve the colour-stabilising effect throughout the resin formed. This creates a more complex reaction process, which will inevitably affect time efficiency and therefore, once again, cost efficiency of producing such resins.

In addition, many of the methods available for producing lighter coloured phenolic resins require the presence of strong acids or bases to catalyse the reaction process. It is known that the use of such chemicals causes corrosion of equipment which will therefore need to be replaced more frequently.

In accordance with the present invention, where a phenolic resin is used, it is preferable for wherein the thermosetting material to comprise:
  uncured phenolic resin;
  filler;
  a catalyst in an amount of less than 2 wt. % relative to the
    content of phenolic resin; and
wherein the filler is present in a ratio of filler to uncured phenolic resin in an amount of 2.5:1 and greater, and further wherein the filler comprises a transition metal hydroxide and/or aluminium hydroxide in a ratio of metal hydroxide to uncured phenolic resin in an amount of 1:1.5 to 3:1.

It has been surprisingly found that the addition of a metal hydroxide compound within the filler allows for the amount of catalyst present to be significantly reduced, and even possibly avoided altogether.

Without wishing to be bound by any particular theory, it is believed that the addition of the metal hydroxide compound allows for the uncured phenolic material to reach an equivalent of B-stage curing without the need for a catalyst to be present in any significant quantity, or even at all.

As would be fully understood by persons of skill in the art, the B-stage refers to partially cured state which allows for increased processability of such phenolic resins, for example, allowing them to be formed into sheets which may then be applied to a substrate and/or surface. The stability is such that the formed sheets can be formed into rolls for storage and later use. Such materials can then be fully cured by the application of heat and pressure.

As discussed above in some detail, a problem with the use of traditional catalysts is the discolouration of the cured resin produced, and therefore the ability to produce composites of different colour finishes and patterns. By use of the material disclosed herein, it is possible to reduce or even alleviate such issues as the amount of catalyst can be used, and in some embodiments avoided altogether.

Preferably, the amount of catalyst that is present may be less than 1 wt. % relative to the content of the phenolic resin, more preferably less than 0.5 wt. % relative to the content of the phenolic resin, such as less than 0.2 wt. %.

In some embodiments, the uncured material may be substantially free of catalyst. By substantially free, it is meant that the amount of any catalyst present is negligible in terms of the overall effect that it has on uncured material, and its ability to reach a B-stage equivalent of curing.

Accordingly, a further aspect of the present invention provides an uncured material for forming a phenolic resin sheet consisting essentially of:
  uncured phenolic resin; and
  filler;
wherein the filler is present in a ratio of filler to uncured phenolic resin in an amount of 2.5:1 and greater, and further wherein the filler comprises a transition metal hydroxide and/or aluminium hydroxide in a ratio of metal hydroxide to uncured phenolic resin in an amount of 1:1.5 to 3:1.

It will also be appreciated that the uncured materials disclosed herein may be free of catalyst.

For the avoidance of any doubt, the term catalyst is intended to refer to additives which are known to catalyse the curing of such phenolic resins, and are known to aid B-stage curing. Traditionally, such catalysts fall into two main categories, namely acidic and basic. Examples of acidic catalysts include, but are not limited to, one or more of hydrochloric acid, sulphuric acid and oxalic acid. Examples of basic catalysts include, but are not limited to, one or more of ammonia, sodium hydroxide, potassium hydroxide, lithium hydroxide, rubidium hydroxide, caesium hydroxide, barium hydroxide, calcium hydroxide and ethylamine.

It will also be appreciated that by reducing the presence of the catalyst material, or even avoided its presence altogether, it is possible to avoid discolouration issues without the need to add colour-stabilising agents, for example, glyoxal, thiones, phosphinic acid salts, phosphonic acid salts such as described above.

Accordingly, yet a further aspect of the present invention provides an uncured material for forming a phenolic resin sheet consisting of:
  uncured phenolic resin;
  filler;
  optionally, further additives specifically as described herein; and
wherein the filler is present in a ratio of filler to uncured phenolic resin in an amount of 2.5:1 and greater, and further wherein the filler comprises a transition metal hydroxide and/or aluminium hydroxide in a ratio of metal hydroxide to uncured phenolic resin in an amount of 1:1.5 to 3:1.

In accordance with the uncured materials described herein (including sheet-form materials in general), the filler may be present in an amount of 3:1 and greater, and preferably in an amount of 3.5:1 and greater. It will be appreciated that the amount of filler which is added is dependent, in some instances on the intended use of the composite being prepared. It will also be appreciated that there is a significant economic advantage in being able to increase the amount of filler whilst still being able to meet the stringent requirements for such composites, such as strength, modulus, fire resistance, weathering resistance etc. Accordingly, the amount of filler present may also be in an amount of 5:1 and greater where applicable.

Suitable fillers for use in the sheet-form curable materials include particulate solids which are insoluble in the thermosetting material, such as filler selected from one or more of clays, clay minerals, talc, vermiculite, metal oxides, refractories, solid or hollow glass microspheres, fly ash, coal dust, wood flour, grain flour, nut shell flour, silica, ground plastics and resins in the form of powder, powdered reclaimed waste plastics, powdered resins, pigments, and starches.

In accordance with the uncured materials described herein (which includes in general the sheet-form materials described herein), the amount of filler may be present in an amount of 20:1 and less, such as in an amount of 10:1 and less.

The uncured phenolic compositions described herein are particularly concerned with phenol-formaldehyde resins.

In general, the fillers used in the sheet-moulding materials described herein may be any particulate solid which insoluble in the resin mixture.

As will be appreciated, it is preferable that the filler is inert to the rest of the uncured material.

The fillers used may be organic or inorganic materials. For some embodiments, it is preferable for the filler to be an inorganic material.

Suitable fillers for use in the uncured phenolic materials described herein may be selected from one or more of clays, clay minerals, talc, vermiculite, metal oxides, refractories, solid or hollow glass microspheres, fly ash, coal dust, wood flour, grain flour, nut shell flour, silica, ground plastics and resins in the form of powder, powdered reclaimed waste plastics, powdered resins, pigments, and starches.

As discussed above, it has been surprisingly found that the addition of a transition metal and/or aluminium hydroxide compound has the surprising effect of allowing the amount of catalyst to be greatly reduced and possibly avoided altogether with respect to phenolic resin systems.

Preferably, the transition metal or aluminium hydroxides are selected from compounds of formula $M(OH)_3$, wherein M is a metal.

Suitable metals (M) may be selected from one or more of scandium, vanadium, chromium, manganese, iron, cobalt and aluminium. In a preferred embodiment, the metal hydroxide is aluminium hydroxide.

In the materials described herein, the transition metal and/or aluminium hydroxide may be present in a ratio of metal hydroxide to uncured phenolic resin in an amount of 1:1.6 to 2.5:1, such as a ratio of metal hydroxide to uncured phenolic resin in an amount of 1:2 to 2:1.

In addition to the transition metal and/or aluminium hydroxide in the compositions described herein, the uncured phenolic material may further comprise ethylenediaminetetraacetic acid (EDTA). However, it is not in any way essential to the present inventions.

In preferred embodiments of the materials described herein, the fillers do not substantially comprise silicates and/or carbonates of alkali metals. This is due to the fact that solids having more than a slightly alkaline reaction, for example silicates and carbonates of alkali metals, are preferably avoided because of their tendency to react with acid hardeners. However, solids such as talc, which have a very mild alkaline reaction, in some cases because of contamination with more strongly alkaline materials such as magnesite, are acceptable for use as fillers.

As discussed above, the use of the transition metal and/or aluminium hydroxide compound allows for the amount of catalyst used to be reduced, or even avoided altogether. A significant benefit of this is that issues known in the art associated with discolouration can be avoided, thus allowing for the use of pigments which previously would not have been suitable, especially for commercial uses where finishes are of great importance.

It will also be understood that suitable colours may include white, yellow, pink, red, orange, green, blue, grey or purple. The reduction in catalyst and therefore the associated discolouration means that lighter colours may now be produced, for example, white, yellow, pink, red, orange, as well as light green, blue, grey and purple. The ability to produce finishes having such light colours greatly improves the commercial applications of such materials.

Phenolic resin materials such as described herein have significant advantages over more traditional materials such as SMC. It has been found that the phenolic resin material disclosed herein generally has the following advantages over SMC:
  Better temperature performance and thermal shock resilience
    The phenolic materials of the present invention can be used to form brake pads, foundry moulds, aerospace heat shields etc.
  Excellent resistance to chemicals, corrosives/solvents, oil and water/salt water (including acid rain)

The phenolic materials of the present invention can be used to make laboratory countertops
Improved fire, smoke and toxicity performance
The phenolic materials of the present invention can be used in mass transport and defence applications
Improved anti-microbial properties
Harder, stronger, excellent dimensional stability
Electrical resistance
Good thermal insulation
Superior workability
Low temperature processing The uncured materials described herein may further comprise a viscosity controlling agent.

Suitable viscosity controlling agents may be selected from one or more of butanol, chloroform, ethanol, water, acetonitrile, hexane, and isopropyl alcohol. In a preferred embodiment, the viscosity controlling agent is water.

It will be appreciated that the amount of viscosity controlling agent used is dependent on the intended use of the uncured material. It is considered that the controlling of the viscosity is within the knowledge of the person of skill in the art.

The sheet-form curable material may comprise reinforcement, for example reinforcing fibres. The sheet-form curable material may include carbon fibres, glass fibres or aramid fibres.

The fibres may be short fibres, or may be longer fibres. The fibres may be loose, for example, the fibres may be arranged in a uni- or multi-directional manner. The fibres may be part of a network, for example woven or knitted together in any appropriate manner. The arrangement of the fibres may be random or regular.

Fibres may provide a continuous filament winding. More than one layer of fibres may be provided. The fibres may be in the form of a layer. Where the fibres are in the form of a layer, they may be in the form a fabric, mat, felt or woven or other arrangement.

In an embodiment, the fibres may be selected from one or more of mineral fibres (such as finely chopped glass fibre and finely divided asbestos), chopped fibres, finely chopped natural or synthetic fibres, and ground plastics and resins in the form of fibres.

In addition, the fibres may be selected from one or more of carbon fibres, glass fibres, aramid fibres and/or polyethylene fibres, such as ultra-high molecular weight polyethylene (UHMWPE).

The sheet-form curable material may include short fibres. The fibres may of a length of 5 cm or less.

Where present, the fibres may be added to the uncured material in a ratio of resin to fibre of 6:1 to 1:3, such as a ratio of from 4:1 to 1:1.

The sheet-form curable materials may be produced by mixing of the components as described above so as to form a generally homogeneous distribution of the components throughout the material. Any known method may be used to produce the general homogeneous distribution, such as high-shear mixing.

The length of time required to produce a generally homogeneous distribution of the components is dependent on, amongst other things, the amount of each component added, the viscosity of the components and the method of mixing used. In general, a substantially homogeneous distribution of the components can be formed within 5 minutes to 2 days, preferably within 10 minutes to 1 day, more preferably within 15 minutes to 10 hours.

The sheet-form curable materials may have a thickness of from 0.3 to (for example 1 mm to 50 mm) to 50 mm, such as from 2 mm to 30 mm, or even 3 mm to 20 mm. Sheets of thickness 4 mm to 15 mm and 5 to 10 mm are also envisaged, as are sheets of 6 mm to 8 mm.

In an embodiment, the sheet-form curable material comprises SMC (sheet moulding compound). The SMC comprises a thermosetting resin, preferably a polyester resin, together with reinforcing fibres, preferably glass fibres. There are benefits in using SMC. For example, SMC has low density and favourable mechanical properties compared with other materials (for example thermoplastics), and also exhibits good thermal properties. Of particular importance for some applications, for example building applications, resistance to fire is good. SMC also shows good noise reduction qualities, also important where used as a building material and good chemical resistance.

The SMC may comprise two main components: a matrix and fibres. The SMC matrix preferably comprises a resin which preferably includes polyester, but may include vinyl ester, epoxy, phenolic, or a polyimide. Preferably the matrix comprises a thermosetting resin. The SMC matrix may further comprise additives, for example minerals, inert fillers, pigments, stabilizers, inhibitors, release agents, catalysts, thickeners, hydrating additives and/or other suitable materials. Suitable fibres are discussed above.

Alternatively or in addition to the presence of fibres in the sheet-form curable material, reinforcement may be provided as a separate layer of fibres such as described above, for example arranged between the sheet-form curable material and the substrate.

Where the separate layer of reinforcement is provided, it may be located across the whole of the substrate, or may for example be provided in only parts. For example, if there is a particular section of the product which is more susceptible to damage or attack, additional reinforcement can be provided in that region. For example, where the product is to be used in a door, additional reinforcement may be provided at regions of the door which are thinner than others for due to decorative moulding or other features and/or at regions of the door which are more susceptible to damage. Thus, reinforcement may be provided as one or more layers separate from the sheet-form curable material. The additional layer of reinforcement may include short and/or long fibres, for example of materials mentioned above.

The method of the present invention may further comprise the step of providing one or more masonry tiles, the masonry tiles preferably being applied to the sheet-form curable material prior to contacting with the particulate substrate.

The use of such masonry tiles allows for the production of products having a brick, concrete, stone, tile or glass surface. Preferred aspects of the invention relate to products comprising a cured skin and a masonry surface, such as a brick, concrete, stone, tile or glass surface.

Structures formed from masonry are traditionally constructed from masonry blocks which are generally laid in and bound together by mortar, in some cases with steel reinforcement. Such structures are generally highly durable, resistant to weathering, have good weight-bearing properties, and are also visually appealing, making masonry a widely-used construction material. However, masonry does have the disadvantages that masonry blocks are heavy, time-consuming to install, and can be extremely costly. Particularly in the case of stone blocks, such as granite or marble, only a small portion of the costly stone is visible in use, making the use of entire blocks of such stone types unnecessary and economically prohibitive. Furthermore, traditional masonry construction techniques do not have the architectural flexibility that is found with more modern construction techniques, such as steel or concrete frame buildings. For instance, masonry construction techniques are generally unsuited to the construction of very tall buildings due to the weight of the masonry blocks. More recently, there are also difficulties in obtaining suitable supplies of masonry products, even allowing for increased expense.

There have been various efforts in the art to develop construction techniques which overcome the disadvantages of traditional masonry techniques, whilst maintaining the visual appeal and durability of traditional masonry in the completed structures. Generally, these techniques involve some kind of masonry cladding or siding. The terms "cladding" and "siding" are used herein to refer to the application of a non-structural layer of masonry to a pre-existing structure, such as a wall or building, usually to imitate the appearance of a traditional masonry structure. The masonry layer is generally substantially thinner than traditional masonry building blocks, being required only for visual and non-structural purposes. Thus, siding materials often take the form of a tile or slip having the surface dimensions of a brick or stone block on the visible surface, but which are typically only 10 to 30 mm in depth.

Siding materials may be applied to structures by being embedded in a layer of mortar coating the surface of the structure, sometimes with the use of metallic or plastic guide rails, which are used to maintain even spacing of the siding materials, for example brick slips. Another technique involves the use of metallic ties or clips which tie the siding materials to the underlying structure and which also transfer the weight of the siding materials to the building structure. Often metallic ties or clips and mortar are used in combination. Usually a pointing substance is subsequently disposed in the spaces between the siding materials to complete the illusion of a traditional masonry structure.

The use of siding materials, whilst having some advantages over traditional masonry construction techniques, nonetheless has the disadvantage that the installation of large numbers of separate siding tiles remains comparatively times consuming, particularly where the materials still require pointing.

The present invention provides the particular advantage of being to produce siding materials where the masonry tile and grouting can be formed in situ, and at the same time during the pressing step. Such a process significantly reduces the duration for formation of siding panels, and indeed the duration of construction projects.

As used herein, the term "masonry tile" is intended to refer to a tile formed, at least in part, from concrete, clay, natural stone, artificial stone, ceramic, glass, or a combination thereof.

For example, the masonry tile may be formed from brick, marble, granite, limestone, travertine, sandstone, slate, cast stone, porcelain, earthenware, glass, or other similar materials, or a combination thereof. For the avoidance of doubt, as used herein, the term masonry tile should not be interpreted to include wood.

Where the masonry tile is formed from a porous material such as clay, porcelain or earthenware, it may be at least partially glazed. For example, the visible surface may be glazed, with the surface that contacts the sheet-form material remaining unglazed. As will be appreciated by persons of skill in the art, an unglazed surface provides a better surface for attachment to the sheet-form material and is therefore preferable to form a strong bond.

The depth of the masonry tile is preferably less than 30 mm, more preferably less than 20 mm, and still more preferably less than 15 mm. Generally, a depth of at least 5 mm is preferred for reasons of durability, although with smaller masonry tiles the depth may be less than 5 mm, for example from 2 to 5 mm, e.g. 3 mm or 4 mm.

Suitably, the masonry tile has a depth in the range of from 3 to 30 mm, more preferably 3 to 15 mm, for example 5 to 15 mm, or 5 to 10 mm.

Generally, the surface area of the masonry tile will not be greater than about 500 mm by 500 mm. However, the exact size of the masonry tile depends on the type of material used to form the masonry tile and the desired visual effect of the composite product. For instance, where the composite product is intended to look like a brick wall, the masonry tiles advantageously have a surface area of from about 190 to about 250 mm by about 55 to about 75 mm to simulate the dimensions of a major side face of a standard building brick.

Alternatively, the masonry tile may have a surface area of from about 95 to about 125 mm by about 55 to about 75 mm to simulate the dimensions of an end face of a standard building brick. For example, the masonry tile could be cut from a standard building block, such as a standard building brick. Alternatively, the masonry tile could be a brick slip of the type known in the art.

In the United Kingdom a standard size building brick generally has a major side face of about 65 mm by about 215 mm and an end face of about 65 mm by about 102. 5 mm. In the United States a standard size building brick generally has a major side face of about 57 mm by about 203 mm and an end face of about 57 mm by about 102. 5 mm.

Where the composite product is intended to look like a stone wall, a larger masonry tile size may be appropriate.

The surface of the masonry tile that contacts the sheet-form material may be provided with surface indentations, pores or protrusions to form a key to ensure a strong bond is formed between the sheet-form material and the masonry tile. For example, a series of parallel or crossed grooves may be provided. In some cases, however, the masonry material may have a sufficiently coarse structure that the provision of surface indentations or protrusions is unnecessary for a strong bond to be formed between the sheet-form material and the masonry tile.

The masonry tile may extend over substantially all or only a part of the sheet-form material and/or the substrate area. Preferably, a plurality of masonry tiles is provided which collectively extend over substantially all or only a part of the sheet-form material and/or the substrate area. In this way, the plurality of masonry tiles may be rigidly bonded onto the surface of the sheet-form material and the substrate in any desired arrangement. For example, the plurality of masonry tiles may desirably arranged so as to imitate the arrangement of masonry building blocks found in traditional masonry construction techniques, for example the traditional brickwork bonds (e.g. Flemish bond, stretcher bond, English bond, header bond, herringbone bond and basket bond).

Optionally, the plurality of masonry tiles may be spaced apart and a rendering or grouting provided by the particulate substrate in the spaces between the masonry tiles to simulate the appearance of bricks bonded together by mortar, or a tiled wall or floor.

Alternatively, a particulate material, such as sand, powdered brick, powdered stone or powdered ceramic, may be pressed into the sheet form material in the spaces between the masonry tiles to simulate the appearance of render or grout. Preferably, the particulate material is pressed into the sheet form material simultaneously with pressing of the masonry tile, the sheet form material and the particulate substrate to form the skin.

In some embodiments, the method of the present invention may further include a step of contacting a surface material in particulate form with a second surface of the sheet-form curable material.

The method of the present invention may further include the step of applying the sheet-form curable material to a mould.

Such moulds are well known in the art and may be used to shape the final skin. By way of example, the mould may be contoured.

In a preferred embodiment, the mould may be in the form of a template, such as a template defining a pattern to be formed by the masonry tiles. Such a template may be used to help position the masonry tiles when forming a skin.

The template may also be used to control the profile of the sheet-form material between the masonry tiles. For the avoidance of doubt, the template can be used to control the depth of the skin in the area between the masonry tiles. Such control allows the position of the grout or render between the masonry tiles to be controlled.

In certain countries, it is known for the grout or render to be lower than the upper surface of the masonry (i.e. the grout or render is sunken compared to the masonry). In other countries, it is preferred for the grout or render to be at a height similar to that of the upper surface of the masonry.

It will also be appreciated that the use of a mould template enables the present invention to be used to produce a range of different styles in situ without needing complicated mould systems or multiple processes.

The mould template, in use, also results in a set of channels in the back surface of the cured skin. Such channels may be particularly beneficial with resect to allowing the flow of air behind the skin once installed.

In a preferred embodiment of the invention, the method comprises:
  optionally providing a template on a press;
  providing a sheet-form curable material on the press
  arranging masonry tiles on a surface of the sheet-form curable material to form a pattern;
  applying a particulate substrate such that it covers at least any remaining surface area of the sheet-form material to the height of the masonry tiles (and preferably also the masonry tiles);
  pressing the sheet-form curable material to the substrate, and
  at least partially curing the sheet-form curable material,
wherein the configuration of the particulate substrate is such that gas and/or vapour can be displaced from the pressing region, and a portion of the sheet-form curable material flows into the particulate substrate.

Preferably the viscosity of the sheet-form curable material is reduced during the pressing step. Preferably the sheet-form curable material is one that reduces in viscosity and/or at least partially liquefies on the application of heat and/or pressure. Preferably, during the pressing step, at least a portion of the sheet-form curable material flows into the interstitial spaces of the particulate substrate. the sheet-form curable material and particulate substrate are such that only a portion of the sheet-form curable material flows into the substrate during the moulding step so that a suitable skin thickness for the required mechanical and other properties of the skin are retained on the surface of the particulate substrate.

Preferably the sheet-form curable material is applied to the substrate in uniform thickness.

The sheet-form curable material is applied to the substrate in unfolded form. A plurality of single thickness layers may be provided, the layers preferably overlapping at the edges to reduce the risk of gaps being formed in the skin.

Preferably the sheet-form curable material is applied to substantially a whole mould surface.

The present invention includes a step of pressing the sheet-form curable material to the substrate. Preferably the pressure applied is less than 200 tonnes per $m^2$, preferably less than about 100 tonnes per $m^2$. In many examples, the pressure applied will be equivalent to less than about 50, 25, 10 or even less than about 5 $kg/cm^2$.

As discussed above, traditional SMC manufacturing processes requires enormous pressure to evacuate the air trapped during the forming of the SMC product and that solid porous substrates were previously known to at least partially alleviate trapped air. Surprisingly, the present invention has found that by putting a particulate substrate behind the SMC skin prior to pressing, the air can escape though the interstitial spaces of the particulate structure reducing potential deformation of the cured skin material.

With respect to the use of phenolic resins, the particulate substrate functions similarly and allows vapours produced during curing to be removed from the pressing region.

In an embodiment of the invention the sheet-form curable material is applied to a mould surface. The mould may comprise aluminium or an aluminium alloy. Where lower pressures are used, aluminium tools can be used. This can give rise to low cost tooling, flexible production and less downtime due to tool change over in view of the reduced weight of an aluminium mould and speed of heating or cooling an aluminium mould compared with a stainless steel mould. For example, the volume of an aluminium tool could be significantly smaller than that of a corresponding tool of steel, and this combined with the lower density of aluminium leads to considerable weight advantages when using aluminium moulds. Where reference is made herein to components being made of or comprising aluminium, preferably the relevant component includes aluminium or an appropriate aluminium alloy or other material including aluminium.

The method may include a step of providing further components, such as between the mould and the sheet-form curable material.

The method further includes the step of providing a veil on a second surface of the sheet-form curable material. In one embodiment the veil is provided between the sheet-form curable material and a surface of the mould. Preferably the veil comprises a sheet of material which is provided between the sheet-form curable material and the mould surface before pressing. The provision of the veil preferably gives rise to improvements or changes in the surface finish of the moulded article compared with an arrangement in which the veil is not present.

The veil is preferably substantially pervious to a component of the sheet-form curable material during pressing. In this way, a component, for example a resin component, of the sheet-form curable material can pass through the veil during moulding so that a resin finish at the surface of the cured product can be formed. Therefore, the material for the veil is preferably chosen so that it is sufficiently pervious to certain components of the sheet-form curable material (in particular the resin), while providing a barrier function for certain other components for example glass fibres or other reinforcements.

In some arrangements the veil can be placed directly adjacent to the mould surface and there will be sufficient penetration by resin components for a satisfactory surface finish to be produced.

The veil may comprise a non-woven material. In particular where the veil is applied directly to the mould, it may be desired for the veil material not to have a particular texture or finish, which might form a perceptible surface structure at the surface of the moulded product. However, in other arrangements, such a surface structure or pattern at the surface may be an advantageous feature.

Where such a structure is not desired, preferably the veil comprises a non-woven material. For example, preferably the veil does not comprise a knitted or woven surface, although in some cases such a material could be used, in particular if a surface treatment had been provided to reduce the surface structure of the veil material. For example, in some arrangements, the veil might comprise a fleece or brushed surface. In some arrangements, the veil may comprise a surface pattern which can be seen through the cured skin product. However, for most applications, preferably at least one surface of the veil material has substantially no surface structure or pattern.

The veil may comprise a felt cloth. For example the veil may comprise a polyester material. Alternative materials could be used, for example comprising wool, polyethylene, polypropylene or PET. The veil might comprise a fleece material, or might comprise a foam material. As indicated above, a suitable material preferably is pervious to the resin to be used, and has a suitable surface texture. The veil may comprise a polyester material, having a weight of about 120 to about 150 g/m².

In some embodiments the method comprises spreading particulate substrate material across the mould surface, applying the sheet-form curable material to the mould, the sheet-form curable material covering the grains, and pressing the sheet-form curable material to the mould to form the skin having the particulates bonded and/or embedded in its surface.

In other embodiments the sheet-form material is applied to the mould before the particulate substrate material.

It will be appreciated that, in principle, particulate substrate material may be applied on both first and second surfaces of the sheet-form curable material, so that a surface effect is produced on both surfaces.

The process of the present invention allows different surface finishes to be present on a single cured skin. By way of example, one surface of the skin may have a smooth finish, and the other surface a stone effect finish.

Likewise, the surface finishes on both sides may be identical.

It will also be appreciated that it is unnecessary for the particulate material of the substrate to be the desired surface finish for the cured skin. It may well be that the desired finish is the opposite surface of the cured skin. Such a surface may be nothing more than the cured sheet-form curable material, which for example could be glossy or matt in finish, and potentially coloured. Such skins could be used, for example, to form body panels for vehicles, or panels for buildings (both interior and exterior).

The particulate substrate material generally becomes embedded in a matrix of the sheet-form curable material. Depending on the materials used and the manner of pressing the components together, the grains may extend from the surface of the matrix material, or may be embedded or submerged in the surface.

The methods of the present invention may further comprise the step of carrying out a surface treatment to increase exposure of the grains in the surface. The surface treatment may include removing surface material or matrix from around the grains.

The method may further include the step of sandblasting the surface containing the grains of surface material. The term sandblasting should preferably be understood to include any technique in which particles are propelled onto the surface to remove part of the matrix material and thus to expose the grains in the surface. Any appropriate method may be used. The sand blasting may be carried out for example by air blasting sand particles at the surface.

Thus in examples the surface formed has a polymer matrix, but also includes particulate substrate material which gives a realistic look to a simulated surface.

The present invention includes a step of pressing the sheet-form curable material to the particulate substrate. In embodiments where the method of the present invention includes one or more of a mould, masonry tiles, a veil or further particulate material, these components are also pressed to the sheet-form curable material. Preferably the pressing is carried out in a single step to form the product. In some examples, the pressing step can form the final product without further machining or other finishing steps being required.

The method of the present invention also includes a step of at least partially curing. The step may include heating the sheet-form curable material. When heated the sheet-form curable material cures to form the skin. In some embodiments the curing step comprises heating the sheet-form curable material to a temperature greater than 100° C., preferably to a temperature greater than 120° C. Heating may improve the flow of the sheet-form curable material.

In some embodiments of the invention, pressing and heating occur simultaneously. In embodiments where the substrate is applied to a press, i.e. a press plate, the press may be a heated press. Alternatively, in embodiments where the sheet-form curable material is applied to a mould, the method may include a step of heating the mould whereby the sheet-form curable material is heated by the heated mould.

In other embodiments of the invention the particulate substrate is heated prior to contact with the sheet form curable material. In these embodiments, the method includes a step of heating the particulate substrate. The particulate substrate may be heated to a temperature described above and then contacted with the sheet-form curable material whereby the sheet-form curable material is heated. In one embodiment the substrate is heated via induction heating. In a separate embodiment the substrate is heated by irradiation with an electromagnetic radiation.

Preferably the electromagnetic radiation comprises radiation with a frequency of from 300 MHz to 300 GHz, preferably from 300 MHz to 30 GHz, more preferably from 300 MHz to 3 GHz. In a preferred embodiment of the present invention, the electromagnetic radiation comprises radiation with a frequency of from 800 MHz to 1000 MHz, preferably from 902 MHz to 928 MHz. In an alternative preferred embodiment of the present invention, the electromagnetic radiation comprises radiation with a frequency of from 2.2 GHz to 2.7 GHz, preferably from 2.4 GHz to 2.5 GHz.

Preferably the particulate substrate is irradiated with electromagnetic radiation with a power of at least 500 W, more preferably at least 700 W, for example at least 800 W. Any suitable power may be used for the irradiation and it will be understood that industrial irradiation systems with much higher power output may be used depending on the specific application. For example the power of the irradiation system may be at least 100 kW or at least 1 MW.

The irradiation may be conducted by any method known in the art. In some embodiments, where the electromagnetic radiation includes microwave radiation, the irradiation is conducted by means of a microwave oven, although other methods of emitting electromagnetic radiation may also be used.

According to a preferred embodiment the irradiation of the particulate substrate is conducted for a time period of from 30 seconds to 6 minutes. Irradiation of the substrate with electromagnetic radiation allows the particulate substrate to be heated rapidly throughout its structure. Therefore, the step of curing the sheet-form curable material may be conducted more rapidly than with the traditional heated press, increasing productivity and minimising damage to sensitive components.

The particulate substrate may be heated to any suitable temperature such that the curing of the sheet-form material is commenced. Preferably, the substrate is heated to a temperature of from 100° C. to 250° C., preferably from 120° C. to 200° C.

After irradiation and resultant heating of the particulate substrate to a temperature such that the curing of the sheet-form curable material is commenced, the particulate substrate may cool slowly to the extent that the curing of the sheet-form material continues after the period of time in which the particulate substrate is irradiated. Therefore, in a preferred embodiment, the sheet-form curable material is allowed to cure for at least 3 minutes after the irradiation of the particulate substrate is completed.

Providing heating by irradiation of the particulate substrate and not of the sheet-form curable material is advantageous for at least the following reasons. Firstly, as the sheet-form curable material forms a skin with an exposed surface, including magnetic susceptor materials in the sheet-form curable material will change the appearance of the sheet-form material and produce an inferior product. Secondly, volatile compounds will be produced in both the manufacture of the substrate and from the curing of the sheet-form curable material. Such volatile compounds are undesirable in the final product as they may have associated health risks and such compounds are also likely to be flammable. Heating the particulate substrate has the advantage of removing such impurities from the substrate, wherein the volatile compounds may be vaporised and pass out of the substrate through its interstitial spaces, rather than collecting in the interstitial spaces.

According to a preferred embodiment, the particulate substrate comprises one or more electromagnetic susceptor materials. In some embodiments, the particulate substrate comprises more than one electromagnetic susceptor materials. For the purposes of the present invention, an electromagnetic susceptor material is considered to be a material which is increased in temperature upon irradiation with electromagnetic radiation. In a preferred embodiment, the electromagnetic susceptor material is a microwave susceptor material, wherein the term microwave is considered to include electromagnetic radiation with a frequency of from 300 MHz to 300 GHz.

The one or more electromagnetic susceptor materials will preferably be added as a filler to the particulate substrate.

Electromagnetic or microwave susceptor materials may comprise any such materials commonly known in the art. Preferably, the electromagnetic or microwave susceptor material comprises one or more of graphite, carbon black, metals, metal oxides, hydrated inorganic salts or compounds, hydrated organic salts or compounds, water, or ceramic materials. The hydrated inorganic salts or compounds may comprise one or more of hydrated sulfates, hydrated phosphates, hydrated zeolites, or hydrated silicates. The hydrated inorganic salt or compound preferably comprises gypsum or clay minerals. In a particularly preferred embodiment, the electromagnetic or microwave susceptor material comprises graphite or gypsum.

In some embodiments, the properties of the substrate may be tailored by adjusting the ratio of the different electromagnetic susceptor materials present in the particulate substrate or the overall amount of electromagnetic susceptor materials in the substrate. For example the precise rate and magnitude of the heating of the particulate substrate may be adjusted in this way.

In some embodiments, a pressing or moulding step is conducted prior to irradiation the substrate. In other embodiments, a pressing or moulding step is conducted at the same time as the irradiation of the substrate and the curing of the sheet-form material.

In an embodiment of the invention the method comprises the steps of providing a substrate in particulate form on a press; providing a sheet-form curable material; contacting the sheet-form curable material with an upper surface of the substrate; pressing the sheet-form curable material to the substrate, and curing the sheet-form curable material, wherein the configuration of the substrate is such that gas and/or vapour can be displaced from the pressing region, and a portion of the sheet-form curable material flows into the first surface of the substrate, this providing a surface effect to the skin.

In this embodiment the sheet-form curable material is placed on a top surface of the substrate, that is, above the substrate. This may enable the sheet-form curable material to flow more easily into the substrate interstitial spaces.

An advantage of the methods described herein is that the cured polymeric skins of the present invention may have a surface effect which arises from the particulate substrate. During the pressing step, some of the particulate substrate material becomes embedded in a matrix of the sheet-form curable material. Depending on the substrate materials used and the manner of pressing the components together, the substrate particles may extend from the surface of the matrix material, or may be substantially embedded or submerged in the surface. After the curing step, the particulate substrate material may be brushed off the cured polymeric skin material with the exception of the particles which have been embedded in the matrix. These embedded particles may remain and form a surface effect on the skin.

Surprisingly, it has been found that any particulate material which has not bonded to the skin may be brushed from the skin after curing leaving a cured polymeric skin with a surface effect. This is advantageous over known methods which provided open celled substrates. In these methods the sheet-form curable material bonded to the open celled substrate during the curing step and therefore had to be machined off in order to separate the skin from the substrate.

In some embodiments of the invention, and as described above, a surface effect material may also be used, as well as the particulate substrate. In these embodiments a skin may be formed wherein a first particulate material is present on a first surface of the skin; and a second particulate material is present on a second surface of the skin.

In a further aspect, the present invention includes a cured polymeric skin formed by a method as described herein.

Such cured polymeric skins may comprise at least a portion of the particulate substrate material is present on a surface of the skin; and optionally a particulate material is present on a second surface of the skin.

The cured polymeric skins may comprise one or more masonry tiles present on a surface of the skin as well as at least a portion of the particulate substrate material. Preferably, the masonry tiles are in a pattern, and the particulate substrate material is between the masonry tiles forming the pattern.

In a preferred embodiment, the cured polymeric skin comprises masonry tiles which are brick-slips in the pattern of a traditional brick wall, and the particulate substrate material forms a grout for the bricks.

In such cured polymeric skins, the sheet-form material is preferably bonded to the masonry tile and/or the particulate substrate material. The presence of the particulate substrate material may also help with bonding of the masonry tiles.

In another aspect the present invention provides the use of a particulate substrate in a method such as described herein above.

The following non-limiting Examples illustrate the present invention.

Example 1

The following examples illustrate production of a cured skin using a sand substrate.

A wooden frame was provided on a flat surface and a substrate comprising sand as the particulate substrate material was provided inside the frame. The sand used had a particle diameter of between 0.6 mm and 2.0 mm and the substrate was around 5 cm deep.

On top of the sand was provided a sheet of SMC material, the SMC sheet extended across the whole of the top surface of the substrate. Downward pressure of around 100 tonnes per $m^2$ was then applied to the components. The SMC material was pressed to the substrate and heated to around 140° C. On heating the SMC material began to liquefy and flow into the interstitial spaces of the substrate.

Air and other gasses trapped between the substrate and the SMC passed through the porous structure of the sand substrate. The components were held in the mould with an application of pressure for a sufficient time for the SMC to cure.

Once cured, the SMC skin material was removed from the sand and any excess sand on the substrate was brushed off to leave a cured SMC skin with a surface effect in the surface which was in contact with the substrate.

Example 2

Figure 1:
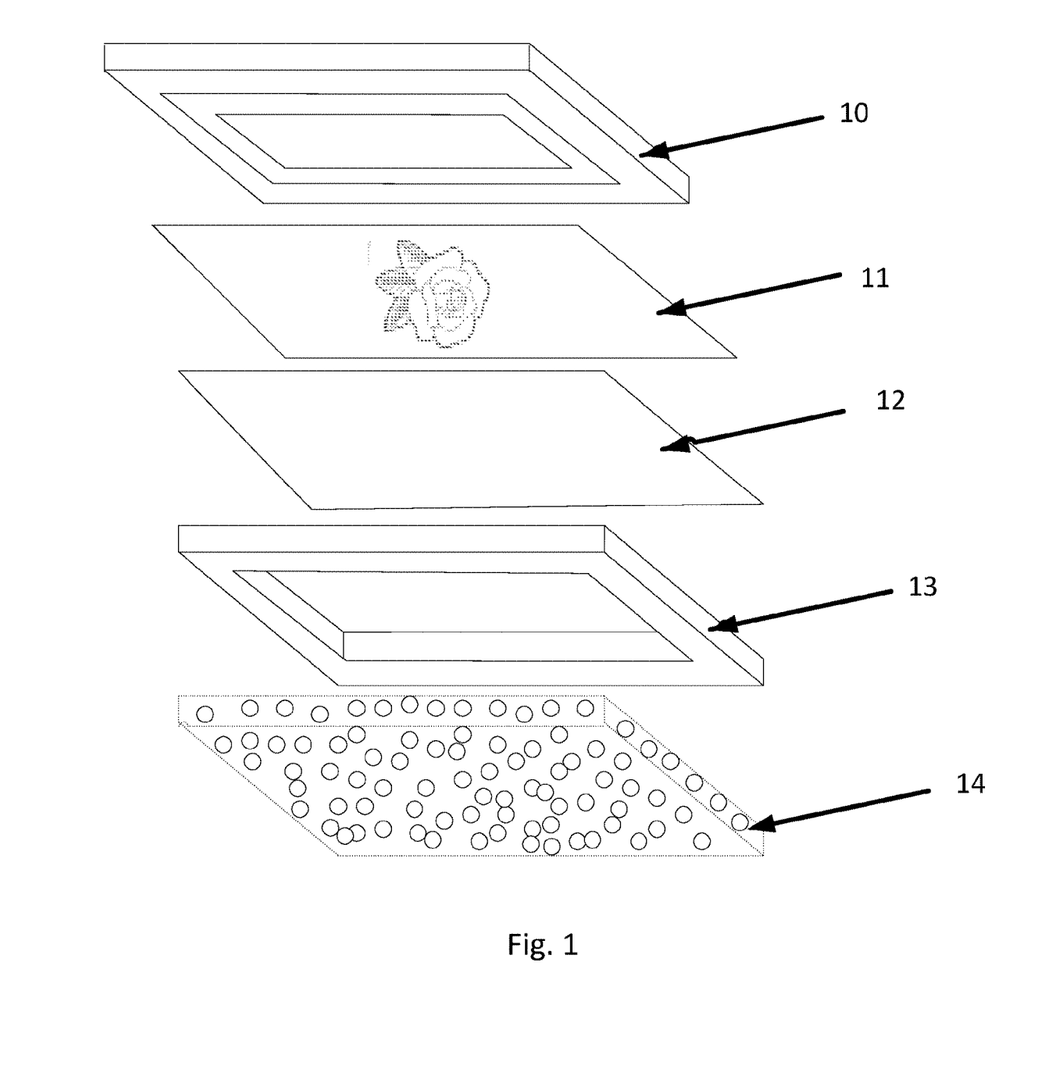
FIG. 1 shows an example of a method of forming a cured polymeric skin product.

The following example will be described with reference to FIG. 1.

A wooden frame (13) was located at an assembly station and the sand substrate (14) was placed inside the wooden frame. Immediately on top of the sand substrate was placed a sheet of SMC (12), the size of the sheet of SMC was so that it was similar to that of the frame surface. Immediately onto the SMC surface was placed a printed veil (11). The veil was sized so as to fit to the SMC surface with little overlap, (the veil may be oversized, in which case trimming may be required after moulding). A press (10) was then placed immediately on top of the veil surface.

The wooden frame and substrate base were then placed onto a lower heated press platen in a press. In this example, the temperature of the lower platen was chosen so that the mould temperature during moulding was about 140° C. An upper platen was then lowered towards the lower platen in the press and pressure applied to effect the moulding operation and form a moulded product. The skin was then removed from the stack of materials and the excess sand brushed off the bottom of the skin to form a skin with two surface effects.

Example 3

Figure 2:
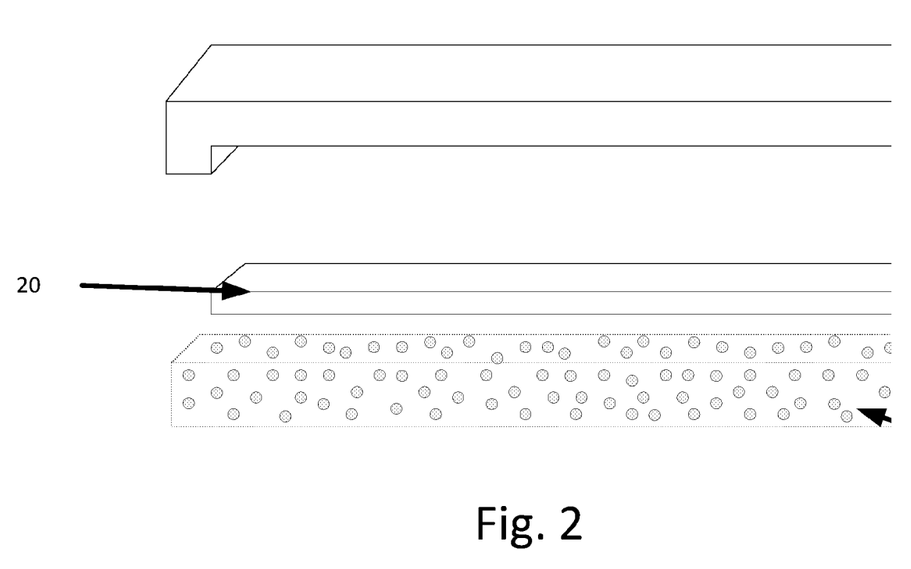
FIG. 2 shows an example of a method of forming a cured polymeric skin with a surface effect.

The following example will be described with reference to FIG. 2.

A mould (24) was heated to 140° C.

A wooden block (not shown) was placed on the mould and was filled with a sand substrate (22).

A sheet of SMC material (20) was then applied to the whole area of the sand substrate.

Downward pressure of around 100 tonnes per $m^2$ was applied to the components.

After cooling, the resulting product was removed from the mould. The sand from the particulate substrate was present on one side of the SMC, where it was pressed to the sand substrate (22), with any excess being brushed off. The other side of the SMC material (20) had a glossy finish.

Example 4

In an example of a method according to the present invention, a particulate substrate is positioned with a surface in contact with a layer of sheet-form curable material, preferably comprising SMC. In this example, the particulate substrate comprises electromagnetic susceptor material such as gypsum or graphite.

A weighted platen is placed on top of the SMC.

The substrate is irradiated with electromagnetic radiation with a frequency of 2.45 GHz and a power of 800 W or 1000 W, for a time period of 1 minute in a microwave oven.

The irradiation raises the temperature of the substrate to approximately 200° C., at which time the sheet-form curable material begins to cure. During the initial curing phase the sheet-form material flows into the interstitial spaces in the particulate substrate. After the irradiation, the materials are allowed to stand for around 3 minutes such that the sheet-form material becomes fully cured.

Advantageously, this example demonstrates that the step of applying pressure may be such that expensive hydraulic pressing apparatus is not required, for example the pressing may be achieved by simply placing a weight on top of the materials.

Example 5

Figure 3:
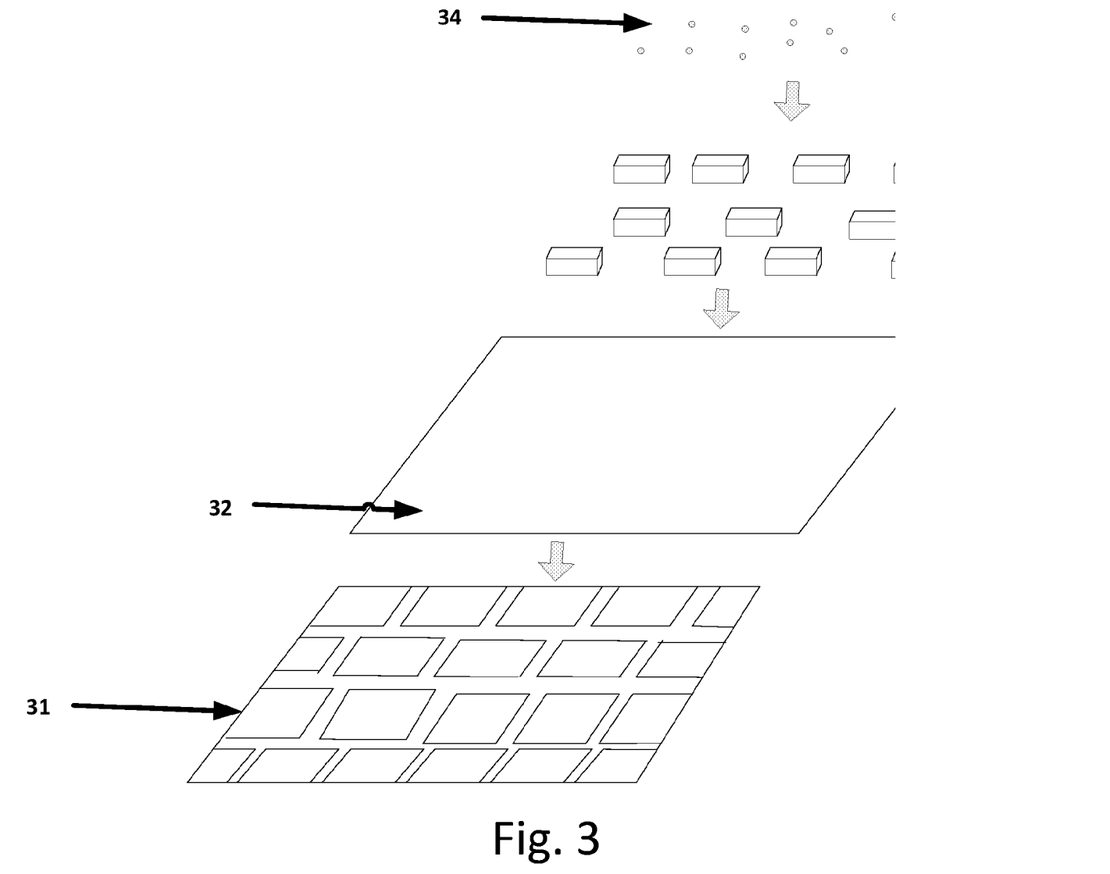
FIG. 3 is an exploded diagrammatic view of a process in accordance with the present invention.
Figure 4:
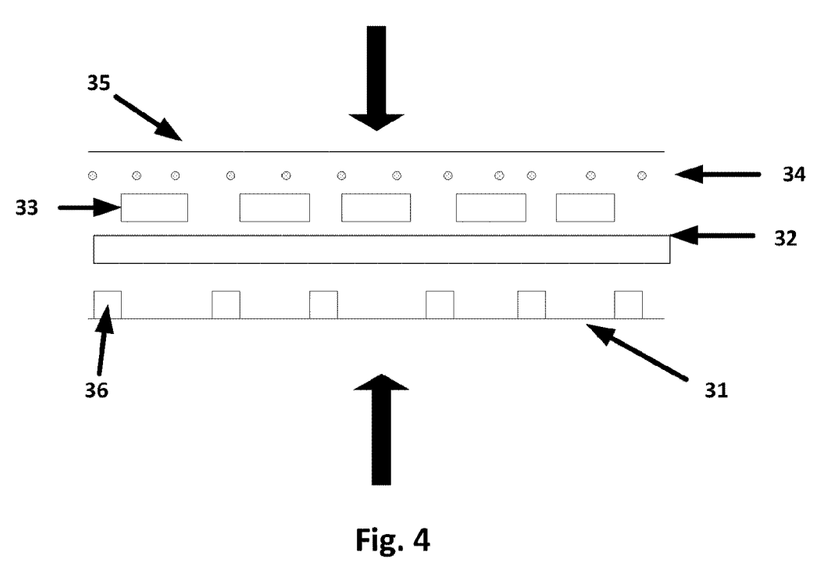
FIG. 4 is a diagrammatic view of the layers as applied in the process of FIG. 3.
Figure 5:
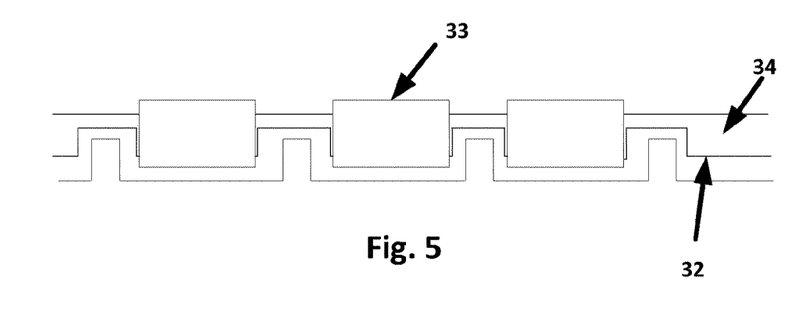
FIG. 5 is a diagrammatic cross-sectional view of the cured skin produced in the process of FIGS. 3 and 4.

The following example will be described with reference to FIGS. 3 to 5.

On a lower part of a press, a template (31), wherein the template is patterned in the form of masonry tiles was provided. In particular, the template comprises raised portions (36) (see FIG. 4) which, in the final product, will result in mimicking of grouting between masonry tiles in traditional brick walls.

A sheet of SMC material (32) was applied to the surface of the template (31), and the sheet was extended so that it covered the whole area of the template.

Masonry tiles (33) were subsequently positioned directly on top of the sheet of SMC (32), such that the masonry tiles (33) were positioned between the raised portions of the template (31).

A layer of particulate sand (34) to form the substrate was applied on top of the arranged masonry tiles (33) and sheet of SMC material (32). The sand used had a particle diameter of between 0.6 mm and 2.0 mm An upper part of the press (35) was then onto the layers, and a downward pressure of around 100 tonnes per m² was applied, such that the masonry tiles (33) and layer of sand (34) were embedded into the sheet of SMC material (32) (see FIG. 5).

Once formed, the produced skin was removed from the mould.

It will be appreciated that the present invention has been described purely by way of example. Each feature disclosed in the description, and (where appropriate) the claims and drawings may be provided independently or in any appropriate combination. Thus it will be appreciated that the various methods described herein could be combined as appropriate to form a particular product.

The invention claimed is:

1. A method of forming a cured polymeric skin, the method comprising:
    providing a sheet-form curable material including a thermosetting material, the thermosetting material including
        uncured phenolic resin,
        filler, and
        a catalyst in an amount of less than 1 wt. % relative to the content of the uncured phenolic resin,
    wherein the filler is present in a ratio of filler to uncured phenolic resin in an amount of 3:1 and greater, and further wherein the filler comprises a transition metal hydroxide and/or aluminium hydroxide in a ratio of metal hydroxide to uncured phenolic resin in an amount of 2:1 to 3:1;
    providing a substrate in particulate form;
    contacting the particulate substrate with a first surface of the sheet-form curable material;
    pressing the particulate substrate to the sheet-form curable material; and
    at least partially curing the sheet-form curable material to form a skin,
    wherein the configuration of the substrate is such that gas and/or vapour can be displaced from the pressing region, and a portion of the sheet-form curable material flows into the particulate substrate.

2. The method according to claim 1, wherein the particulate substrate comprises a plurality of interstitial spaces between the particles such that the sheet-form curable material can flow into the particulate substrate.

3. The method according to claim 2, wherein the interstitial spaces have a diameter in the range of 0.25 to 5 mm.

4. The method according to claim 1, wherein the particulate substrate comprises one or more particulate materials selected from sand, gypsum, graphite, calcium carbonate, hydrated organic salts, ceramic materials, clay materials, and metal oxides.

5. The method according to claim 1, wherein the particulate substrate comprises one or more materials susceptible to electromagnetic radiation.

6. The method according to claim 1, wherein the sheet-form curable material has a thickness of 0.3 to 50 mm.

7. The method according to claim 1, wherein the catalyst is present in an amount of less than 0.5 wt. % relative to the content of the uncured phenolic resin.

8. The method according to claim 1, wherein the transition metal or aluminium hydroxides are of formula $M(OH)_3$, wherein M is a metal.

9. The method according to claim 1, wherein the filler is a particulate solid which is insoluble in the thermosetting material.

10. The method according to claim 1, wherein the sheet-form curable material further comprises fibers, wherein the fibers are added to the uncured material in a ratio of resin to fiber of 6:1 to 1:3.

11. The method according to claim 1, further comprising the step of providing one or more masonry tiles, the masonry tiles being applied to the sheet-form curable material prior to contacting with the particulate substrate.

12. The method according to claim 11, wherein masonry tiles have a depth in the range of from 3 to 30 mm.

13. The method according to claim 1, further including a step of applying the sheet-form curable material to a mould.

14. The method according to claim 13, wherein the mould is in the form of a template defining a pattern to be formed by the masonry tiles.

15. The method according to claim 1, further including a step of providing a veil on a second surface of the sheet-form curable material between the sheet-form curable material and a surface of a mould.

16. The method according to claim 1, further including a step of contacting a particulate surface material with a second surface of the sheet-form curable material and pressing the sheet-form curable material and the surface material.

17. The method according to claim 1, wherein after at least partially curing, at least a part of the particulate material is exposed at a surface of the sheet-form material.

18. The method according to claim 1, wherein the curing step comprises heating the sheet-form curable material to a temperature greater than 100° C.

19. The method according to claim 1, wherein the particulate substrate is heated prior to contact with the sheet-form curable material.

20. The method according to claim 5, further including a step of irradiating the particulate substrate with electromagnetic radiation to increase the temperature of the substrate.

21. The method according to claim 11, the method comprising:
    providing a sheet-form curable material on a press;
    arranging masonry tiles on a surface of the sheet-form curable material to form a pattern;
    applying a particulate substrate such that it covers at least any remaining surface area of the sheet-form material to the height of the masonry tiles;
    pressing the sheet-form curable material to the substrate; and
    at least partially curing the sheet-form curable material, wherein the configuration of the particulate substrate is such that gas and/or vapour can be displaced from the pressing region, and a portion of the sheet-form curable material flows into the particulate substrate.

* * * * *